(12) United States Patent
Donick

(10) Patent No.: US 12,330,753 B2
(45) Date of Patent: Jun. 17, 2025

(54) MARINE-LIFE SAFE AND SELF PROPELLED NAVIGATIONAL BUOY

(71) Applicant: Mary Donick, Surprise, AZ (US)

(72) Inventor: Mary Donick, Surprise, AZ (US)

( * ) Notice: Subject to any disclaimer, the term of this patent is extended or adjusted under 35 U.S.C. 154(b) by 545 days.

(21) Appl. No.: 17/650,848

(22) Filed: Feb. 12, 2022

(65) Prior Publication Data

US 2023/0041185 A1 Feb. 9, 2023

Related U.S. Application Data

(60) Provisional application No. 63/203,935, filed on Aug. 4, 2021.

(51) Int. Cl.
| | |
|---|---|
| B63B 22/16 | (2006.01) |
| B63B 22/18 | (2006.01) |
| B63B 79/10 | (2020.01) |
| B63B 79/40 | (2020.01) |
| B63H 21/17 | (2006.01) |
| H02K 5/132 | (2006.01) |
| H02S 10/40 | (2014.01) |
| H02S 40/38 | (2014.01) |

(52) U.S. Cl.
CPC ............ *B63B 22/166* (2013.01); *B63B 22/18* (2013.01); *B63B 79/10* (2020.01); *B63B 79/40* (2020.01); *B63H 21/17* (2013.01); *H02K 5/132* (2013.01); *H02S 10/40* (2014.12); *H02S 40/38* (2014.12); *B63H 2021/171* (2013.01)

(58) Field of Classification Search
CPC ....... B63B 22/16; B63B 22/166; B63B 22/18; B63B 79/10; B63B 79/40; B63B 2021/171; B63H 21/17; B63J 2003/046; H02K 5/132; H02S 10/40; H02S 40/38
USPC .................... 441/1, 6, 13, 16, 21, 22, 28, 32
See application file for complete search history.

(56) References Cited

U.S. PATENT DOCUMENTS 10,067,507 B2 * 9/2018 Davoodi ................ B63B 22/22

\* cited by examiner

*Primary Examiner* — Daniel V Venne
(74) *Attorney, Agent, or Firm* — University of Arizona IP Clinic

(57) ABSTRACT

A navigational buoy that includes a finned, hollow, transparent, spherical shell that floats on water. A multi-wheeled motor-unit sits inside the shell, and ballast weights attached to the motor unit cause it to rest on the bottom of the shell. A biasing structure attached to the motor unit, lights, and other aspects are included in some embodiments.

16 Claims, 7 Drawing Sheets

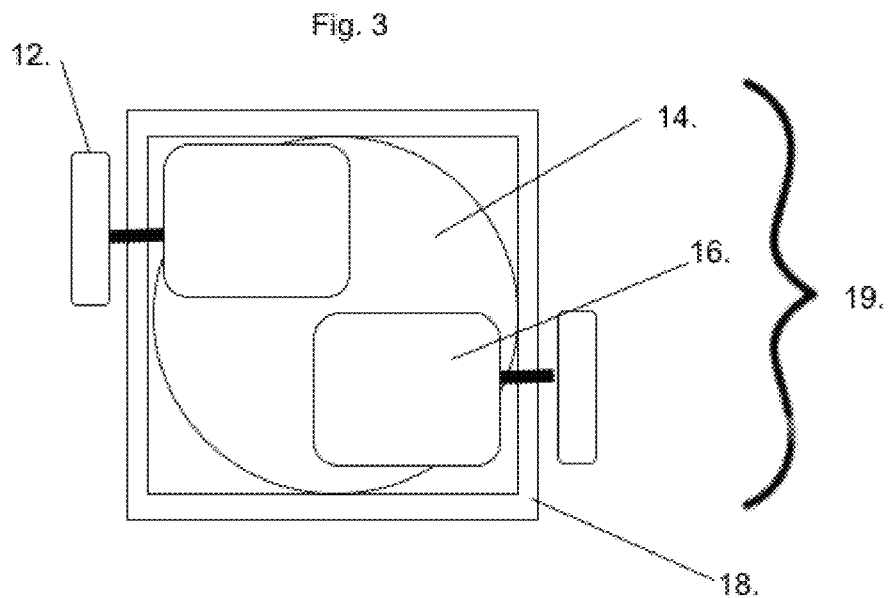
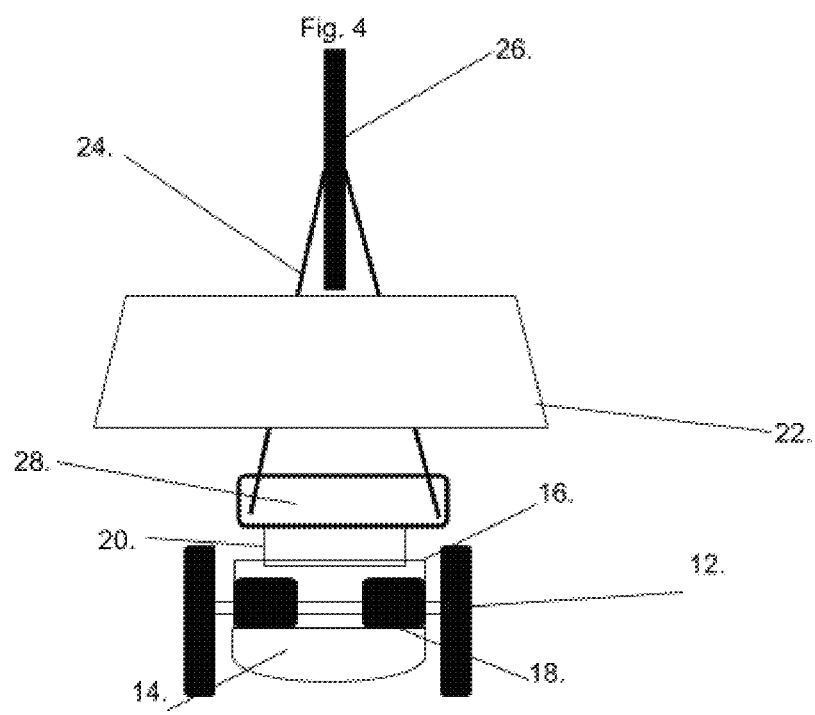

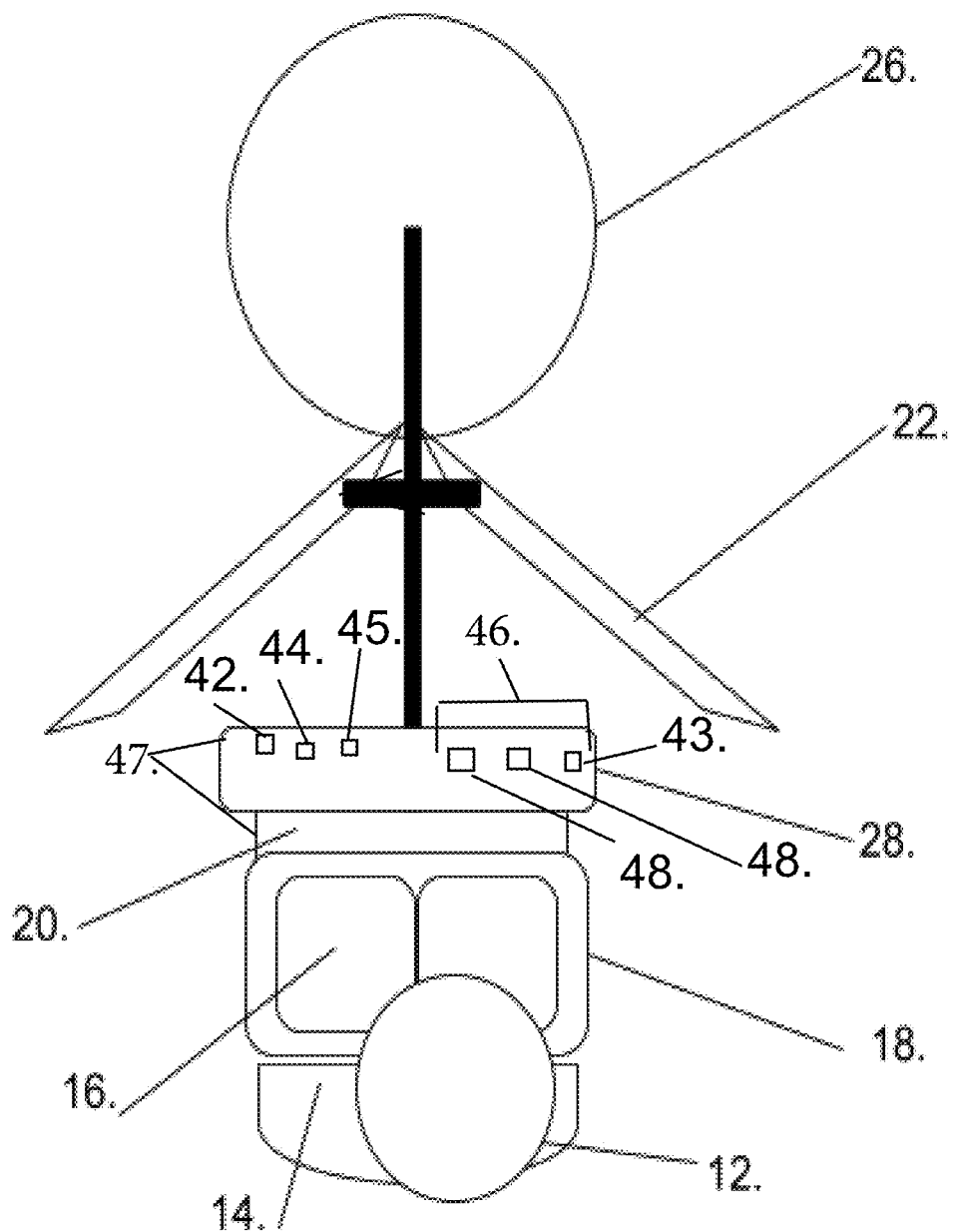

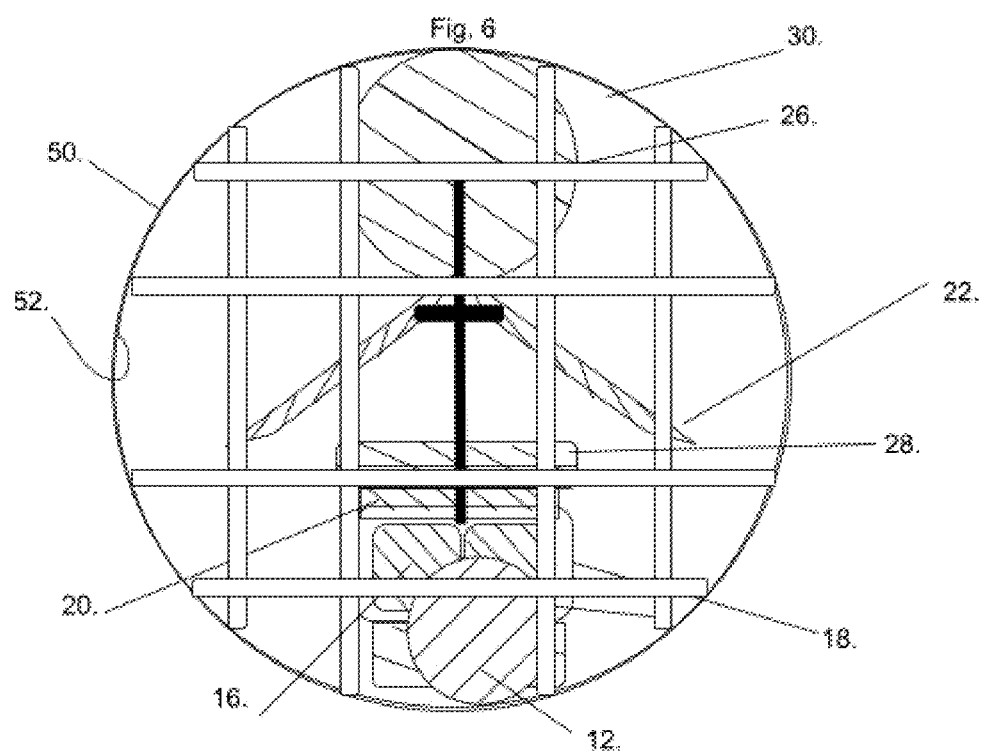

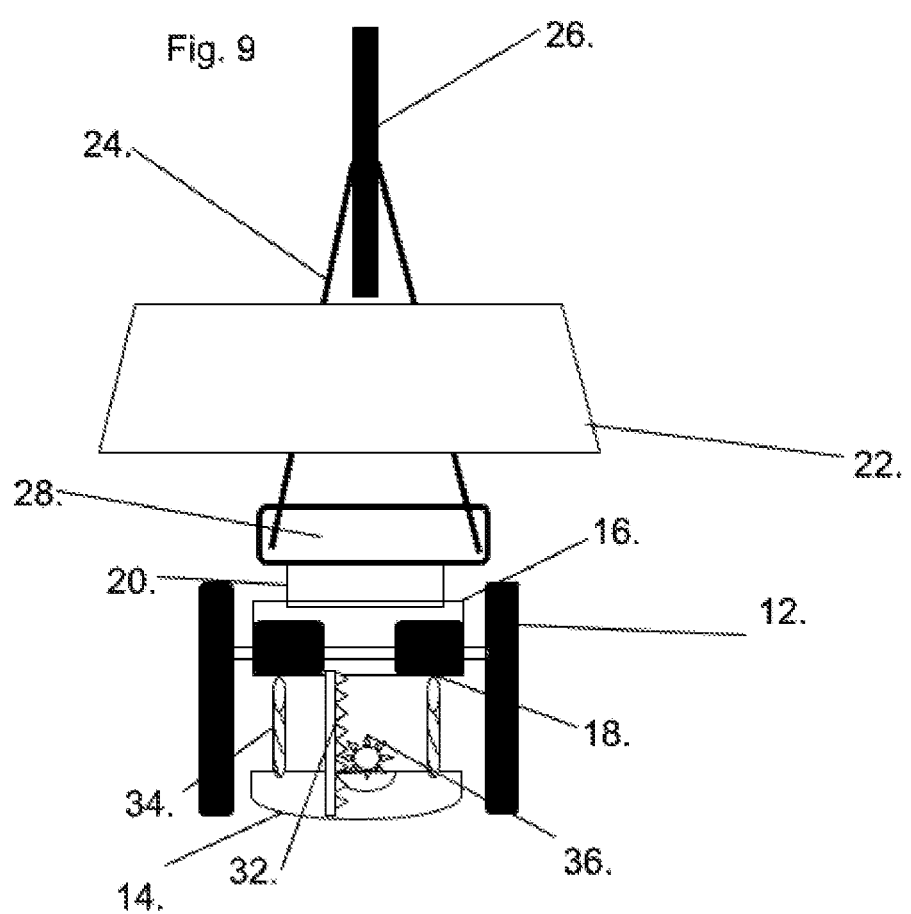

MARINE-LIFE SAFE AND SELF PROPELLED NAVIGATIONAL BUOY

BACKGROUND OF THE INVENTION

Embodiments herein relate generally to safe and sustainable marine navigation, environmental preservation as it relates to marine navigation, navigational buoys signal channels, regulations, and hazards to boaters.

DESCRIPTION OF RELATED ART

Although buoys must float on water, they must also maintain a constant geographic position because they signal location-specific information. Typically, chains, ropes, cables, or shafts connect the buoy to an underwater anchoring device. Marine mammals often entangle themselves in the chains or rope and drown. A marine-life safe buoy would be able to float freely on the water thereby avoiding the problem of marine mammal entanglement. To maintain the utility of a typical navigational buoy, a marine-life safe buoy would also need to maintain its geographical position.

A hollow drum sits atop a typical navigational buoy. Different colors and markings on the drum signal different information. For example, red buoys and greens drums mark boating channels. Black and white striped drums indicate underwater obstructions. Typically, a boat tows the drum to the desired geographic location. A rope, shaft, chain or cable then attaches the drum to an anchor resting on or fixed to the sea bottom.

SUMMARY OF THE EMBODIMENTS

The navigational buoys described herein differ substantially from current navigational buoy designs because they require neither tether nor anchor to maintain a geographic location.

The embodiments herein differ from all prior navigational buoys in that they use an internal wheeled-motor unit, rather than a tether and anchor system, to maintain a geographic position. The motor unit can also be used to reposition the buoy to reflect changing navigational conditions.

In one embodiment, a finned, spherical shell containing a wheeled motor unit is provided. When the wheels on the unit spins, the finned shell rotates, paddling itself in the direction in which the wheels roll. This combination of shell and internal moving unit resembles several spherical toys, vacuums, and vehicles. Each of these comprises a hollow sphere containing wheels or balls that when pressed against its inner surface and rotated causes the sphere to rotate in the same direction, rolling along the ground. However, the embodiments herein provide several novel and innovative elements to existing devices.

In one embodiment, a buoy comprises a finned, hollow, transparent, spherical shell that floats on the water. A multi-wheeled motor-unit sits inside the shell. Ballast weights attached to the motor unit cause it to rest on the bottom of the shell. A biasing structure attached to the motor unit positions a single additional wheel that makes contact the inner surface of the spherical shell at a point collinear with the center mass of the motor unit, where the center of the two points lies on a diameter of the sphere. This wheel points in the same direction as the motor-unit wheels and ensures that friction between the sphere and the motor unit wheels causes the sphere, rather than the motor unit, to move when the motor unit wheels rotate. Fins attached to the shell's exterior cause it to roll, rather than slip, on the surface of the water.

In many embodiments, a microprocessor, antenna, and GPS receiver control the position of the unit. The motor unit independently drives each of the wheels, such that the unit spins when the wheels rotate in opposite directions. Using information from the GPS receiver, the microprocessor continuously compares the actual GPS coordinates of the unit with the GPS coordinates of its desired location and adjusts the heading and speed of the motor unit wheels appropriately to correct the location of the unit. Because the microprocessor continuously calculates the position of the buoy and corrects through activation of the wheeled motor unit, the buoy maintains its position without the use of tethers that endanger marine life.

In a preferred embodiment, the circuit board hosts an RGB LED. The color of the LED signals the relevant navigational information to boaters. In an alternative embodiment, the color of the shell conveys this information.

In one design, solar panels and a solar battery power the unit. In an alternative embodiment, virtual absorption mechanisms store energy harvested from harmonic motion of the waves.

These and other aspects are further described herein and illustrated. However, the claims are not intended to be limited to such description and illustrations.

BRIEF DESCRIPTION OF DRAWINGS

FIG. 3 shows a top view of the motors, ballast, and motor housing.

FIG. 4 shows a side view of the motor unit, circuit board, solar panels, biasing wheel, and biasing wheel supports.

FIG. 5 shows a front view of the motor unit, circuit boards, solar panels, biasing wheel, biasing wheel.

FIG. 6 shows a front view of the motor unit, circuit boards, solar panels, biasing wheel, biasing wheel encased in a spherical shell.

FIG. 9 shows a front view of motor unit, circuit board, solar panels, biasing wheel, biasing wheel supports, rack, spring, and pinion mechanism for harnessing harmonic energy.

DETAILED DESCRIPTION

In various embodiments, a navigational buoy capable of maintaining its geographic position without the use of invasive anchors, tethers, or cables is provided. The navigational buoy can be placed anywhere in the ocean where other navigational buoys are used to manage maritime navigation. Through the use of various energy harvesting techniques, these navigational buoys are capable of self-sustained power.

Figure 1:
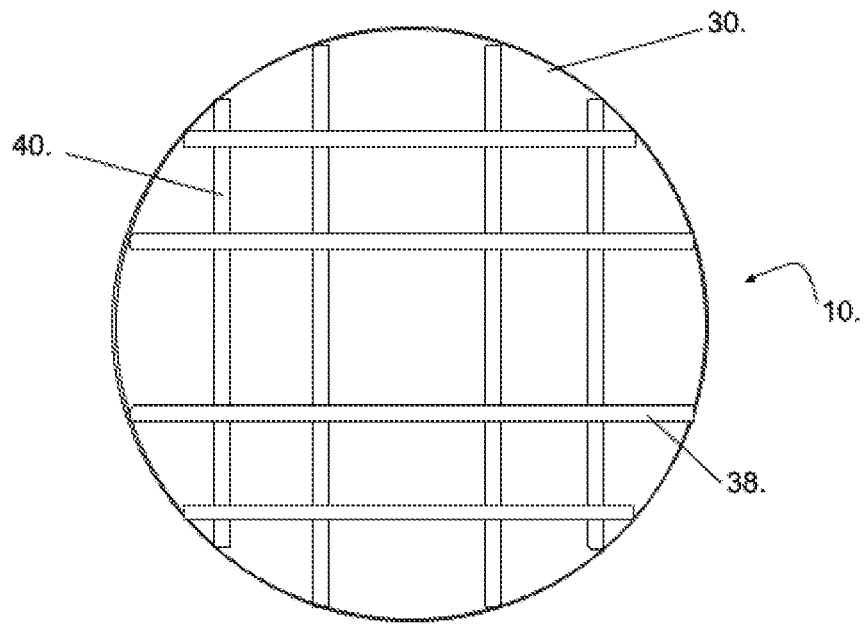
FIG. 1 shows a front view of the spherical shell.

Referring initially to FIG. 1, encasing the navigational buoy 10 is the spherical shell 30 which includes both horizontal fins 38 and vertical fins 40. Both the horizontal fins 38 and vertical fins 40 encircle the spherical shell 30. Additionally, the horizontal fins 38 and vertical fins 40 extend outwardly from the spherical shell 30 in order to serve like paddles as the spherical shell rotates which allows movement of the navigational buoy to its intended location. The horizontal fins 38 and vertical fins 40 are placed such that the navigational buoy 10 and is able to move laterally on the water in any direction.

Figure 2:
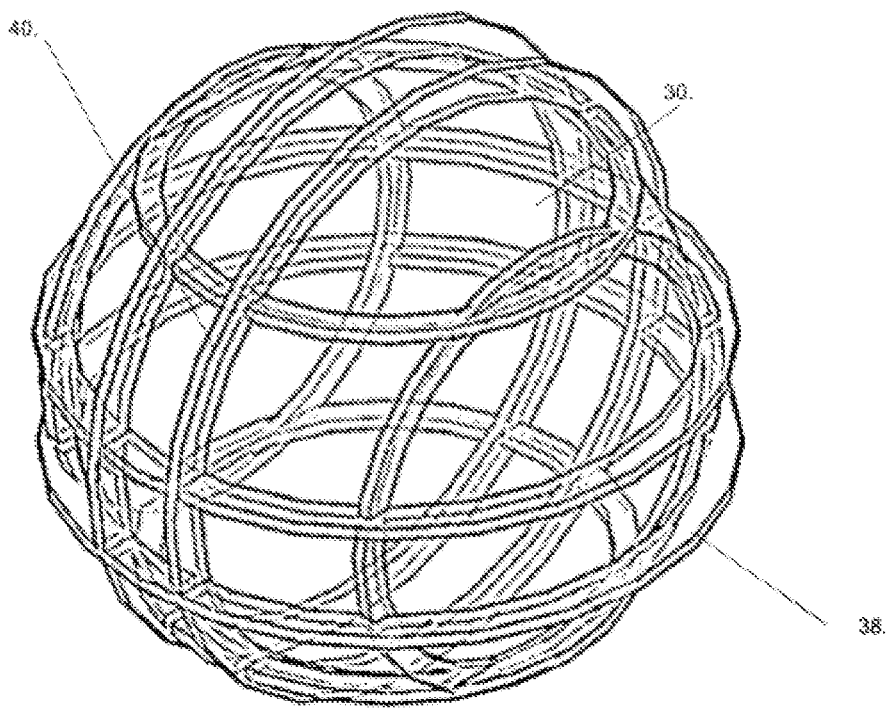
FIG. 2 shows a perspective view of the spherical shell.

Shown from a perspective view is the spherical shell and the accompanying fins in FIG. 2. The horizontal fins 38 are shown in four rings whose circumference is dictated by the shape of the spherical shell 30. The vertical fins 40 are also shown in four rings with various circumferences based on the shape of the spherical shell 30. Alternatively, there may be more or fewer sets of horizontal fins 38 or vertical fins 40 depending on the size of the spherical shell 30, the geographic position of the navigational buoy 10, and/or the width or extension of the rings outwardly from the spherical shell 30. And, as shown in FIG. 2, the vertical fins 40 may extend outwardly more than the horizontal fins 38 or the horizontal fins 38 may extend outwardly more than the vertical fins 40. Additionally or alternatively, the horizontal fins 38 and vertical fins 40 may extend outwardly the same distance from the spherical shell 30 depending on the size of the spherical shell 30, the geographic position of the navigational buoy 10, and/or the width or extension of the rings outwardly from the spherical shell 30.

As illustrated in FIG. 3, to move the navigational buoy 10 from one location to another, motors 16 drive biasing wheels 12 inside the spherical shell 30. The direction of the navigational buoy 10 is driven primarily by biasing wheels 12 that roll while in frictional contact with the inside of the spherical shell 30 thereby rotating the spherical shell 30 in a desired direction.

In order to rotate the biasing wheels 12, the biasing wheels 12 are connected to a motor or motors 16. In one embodiment, the biasing wheels 12 are connected to a single motor 16 that drives the biasing wheels 12 in a uniform way. In another embodiment, each of the biasing wheels 12 is connected to its own motor 16 which allows each of the biasing wheels 12 to move at differing speeds which, in turn, allows the spherical shell 30 to rotate about a z-axis as well as rotate about an x-axis. The motor 16 is contained in a motor housing 18 which is waterproof and used to protect its contents from the elements. Contained in the motor housing 18 is a ballast weight 14 which is used to keep the motor housing 18, motors 16, and the biasing wheels 12 at the bottom of the spherical shell 30. The ballast weight 14 is also used to maintain a frictional connection between the biasing wheels 12 and the inside of the spherical shell 30. The biasing wheels 12, ballast weight 14, motors 16, and motor housing 18, are collectively referred to as a motor unit 19.

FIG. 4 illustrates a side view of the contents housed in the spherical shell 30 and FIG. 5 illustrates a front view of the same contents in spherical shell 30. The biasing wheels 12, motors 16, motor housing 18, and ballast weight 14 illustrated in FIG. 3 are shown toward the bottom of the figure. Attached to the motor housing 16 is a power source 20 and circuitry 28. The circuitry 28 may include microprocessor 42, GPS receiver 43, controllers 44, antenna 48, and LED all contained in a housing designed to control the speed and direction of the motors 16. In some embodiments, the controller receives direction from a GPS unit which allows the navigational buoy 10 to maintain a specific location based on GPS coordinates. Additionally or alternatively, the circuitry 28 may include a receiver which allows a user to control the buoy remotely. Additionally or alternatively, the circuitry may include a timer that adjusts the speed and direction of the motors based on a specific time. Additionally or alternatively, the circuitry 28 may have a combination of receivers, GPS unit, and timer, which operate as sensors 46, to adjust the speed and direction of the motors based on some combination of time, GPS location, and/or remotely controlled direction. The power source 20, microprocessor 42, and sensors 46 collectively are referred to as control unit 47 as illustrated in FIG. 5.

In order to power and recharge the power source 20 the navigational buoy may contain solar panels 22. The solar panels 22 are located between the circuitry 28 and the large wheel 26. The large wheel 26 is connected to the circuitry via support structure 24. The support structure 24 connect the large wheel 26 to the lower half of the navigational buoy. The purpose generally of connecting the large wheel to the lower half of the navigational buoy is to allow the biasing wheels 12 and the large wheel 26 to maintain frictional contact with the inside of the spherical shell 30.

Figure 7:
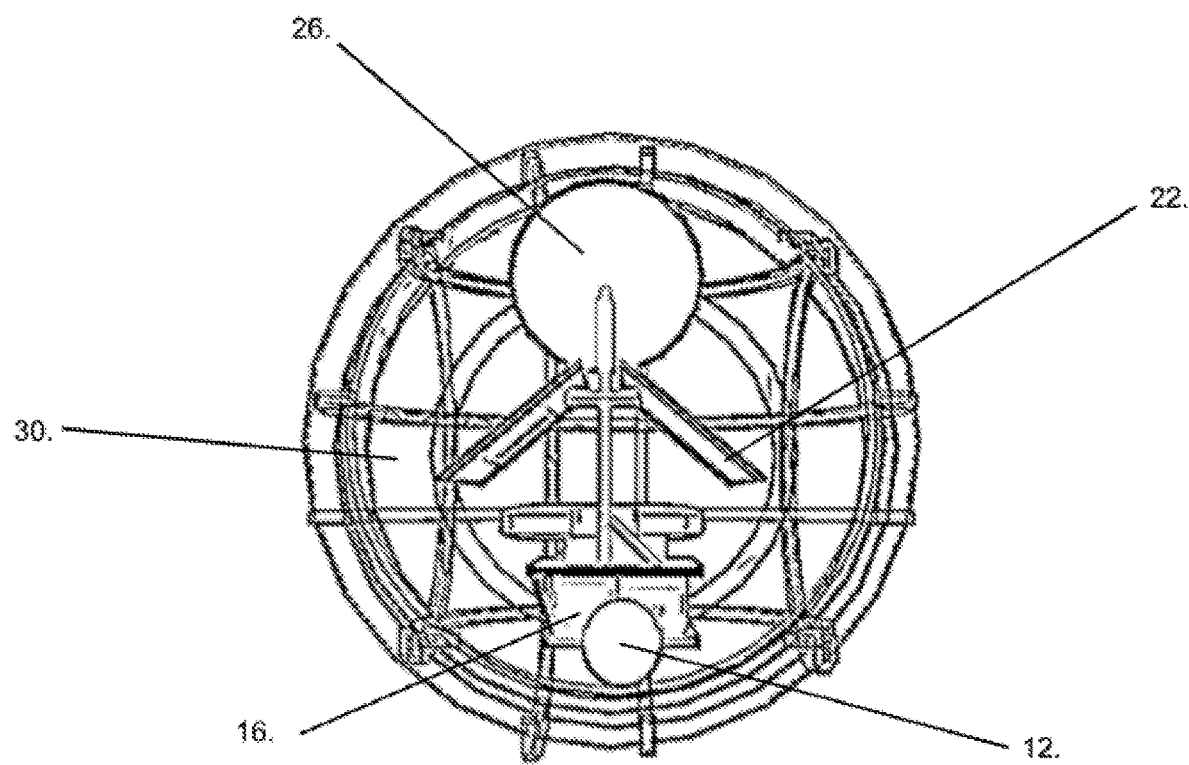
FIG. 7 shows a cross-sectional view of the motor unit, circuit boards, solar panels, biasing wheel, biasing wheel supports encased in the spherical shell.

The components of the navigational buoy are designed to fit inside the spherical shell 30 as shown in FIG. 6. The outer surface 50 is the exterior of the spherical shell 30 and the inner surface 52 is the interior of the spherical shell 30. The solar panels 22 fit inside the spherical shell 30. In some embodiments, the spherical shell 30 is translucent to allow light to penetrate the spherical shell for the solar panels 2 to collect energy for the power source 20. Additionally the LEDs, collectively referred to as light sources 45, as a part of the circuitry 28 may light up the spherical shell 30 to display various colors indicating various maritime signals. A cross section of FIG. 4 is shown in FIG. 7. The contents of the navigational buoy are contained between the biasing wheels 12 and large wheel 26 in an upright position. That is, the spherical shell 30 rotates in a direction according to the rotation of the biasing wheels 12 controlled by the motors 16 and spherical shell 30 rotates about the contents of the navigational buoy 10 while the contents maintain its upright position.

Figure 8:
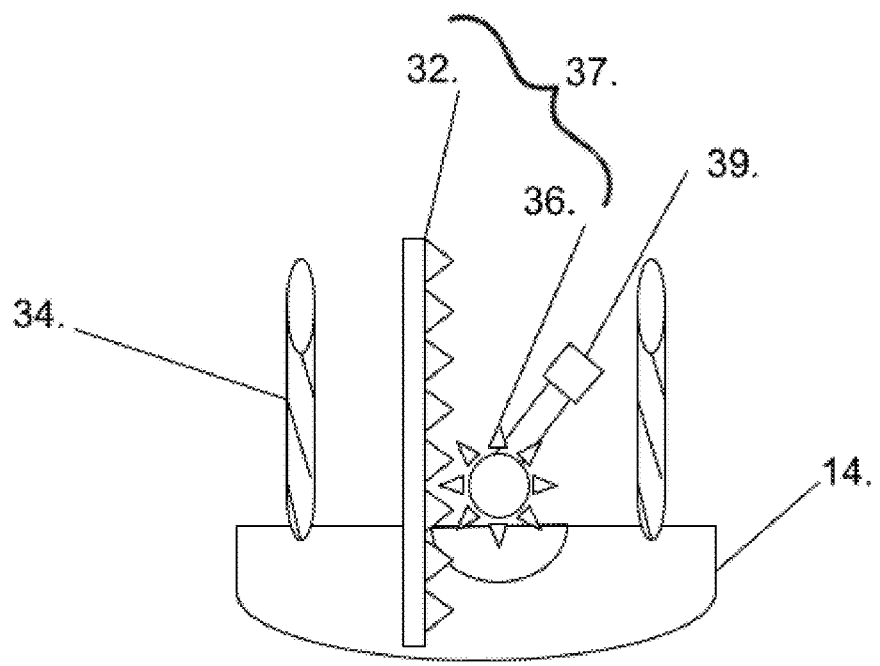
FIG. 8 shows a front view of the rack, spring, and pinion mechanism for harnessing harmonic energy.

In another embodiment, as shown in FIGS. 8 and 9, the navigational buoy 10 may harness harmonic motion in the waves and movement of the ocean. Additionally or alternatively, the navigational buoy 10 may use solar power, harmonic motion, or a combination of solar power and harmonic motion to recharge the power source 20. As illustrated in FIG. 8, an embodiment may contain springs 34 placed substantially equidistant from the center of the ballast weight 14. The ballast weight 14 may have a cavity wherein the pinion 36 may move or turn freely. As the navigational buoy 10 encounters harmonic motion, the springs 34 will expand and contract accordingly. The expansion and contraction will move the rack 32 which, in turn, causes the pinion 36 to rotate. The rack 32 and pinion 36 are collectively referred to as a rack and pinon set 37. That rotating pinion 36 may be attached to a generator 39 being charged by the rotation caused by the harmonic motion the navigational buoy 10 inevitably encounters.

As illustrated specifically in FIG. 9, the springs 34, rack 32, pinion 36 may be integrated into the contents of the navigational buoy 10. The springs 34 attach the ballast weight 14 to the motor housing 18 in a way that will not impede the frictional connection between the biasing wheels 12 to the inside of the spherical shell 30. Furthermore, as shown in FIG. 9, a combination of solar panels and harmonic motion capture may be used to maintain a charge in the power source 20 and provide a self-sustaining navigational buoy 10 that maintains a geographic position without the use of invasive chains, ropes, or anchors.

The invention is claimed as follows:
1. A navigational buoy comprising:
   a motor unit comprising:
      at least one motor;
      a housing encasing the at least one motor;

at least two wheels operatively connected to the at least one motor; and
a ballast weight coupled to the housing;
a control unit comprising:
a power source;
a microprocessor; and
a plurality of sensors for autonomous control of the motor unit, for directed control of the motor unit, or for a combination of autonomous and directed control of the motor unit;
a spherical shell encompassing the motor unit comprising:
an inner surface;
an outer surface; and
a plurality of fins disposed on the outer surface of the spherical shell and extending outwardly therefrom.

2. The navigational buoy of claim 1 wherein the spherical shell further comprises a plurality of light sources capable of illuminating at least the outer surface of the spherical shell.

3. The navigational buoy of claim 1 wherein the plurality of sensors further comprises a Global Positioning System receiver.

4. The navigational buoy of claim 1, wherein the power source comprises a solar panel and a battery.

5. The navigational buoy of claim 1, wherein the power source is a generator.

6. A navigational buoy comprising:
a motor unit comprising:
at least one motor;
a housing encasing the at least one motor;
at least two wheels operatively connected to the at least one motor; and
a ballast weight coupled to the housing;
a control unit comprising:
a power source;
a microprocessor; and
a plurality of sensors for autonomous control of the motor unit, for directed control of the motor unit, or for a combination of autonomous and directed control of the motor unit;
a spherical shell encompassing the motor unit comprising:
an inner surface;
an outer surface;
a plurality of horizontal fins disposed on the outer surface of the spherical shell and extending outwardly therefrom;
a plurality of vertical fins disposed on the outer surface of the spherical shell and extending outwardly therefrom; and
a support structure coupled to the motor unit and coupled to the inner surface of the spherical shell.

7. The navigational buoy of claim 6 wherein the support structure further comprises a biasing wheel continuously engaging the inner surface of the spherical shell such that the at least two wheels continuously engage the inner surface of the spherical shell.

8. The navigational buoy of claim 6 wherein the spherical shell further comprises a plurality of light sources capable of illuminating at least the outer surface of the spherical shell.

9. The navigational buoy of claim 6 wherein the plurality of sensors further comprises a Global Positioning System receiver.

10. The navigational buoy of claim 6, wherein the power source comprises a solar panel and a battery.

11. The navigational buoy of claim 6, wherein the power source is a generator.

12. A navigational buoy comprising:
a motor unit comprising:
at least one motor:
a housing encasing the at least one motor;
at least two wheels operatively connected to the at least one motor; and
a ballast weight coupled to the housing;
a control unit comprising:
a power source;
a microprocessor; and
a plurality of sensors for autonomous control of the motor unit, for directed control of the motor unit, or for a combination of autonomous and directed control of the motor unit;
a spherical shell encompassing the motor unit comprising:
an inner surface;
an outer surface;
a plurality of horizontal fins disposed on the outer surface of the spherical shell and extending outwardly therefrom;
a plurality of vertical fins disposed on the outer surface of the spherical shell and extending outwardly therefrom;
a support structure coupled to the motor unit and coupled to the inner surface of the spherical shell; and
a generator operatively attached to:
at least one spring; and
at least one rack and pinion set.

13. The navigational buoy of claim 12 wherein the support structure further comprises a biasing wheel continuously engaging the inner surface of the spherical shell such that the at least two wheels continuously engage the inner surface of the spherical shell.

14. The navigational buoy of claim 12 wherein the spherical shell further comprises a plurality of light sources capable of illuminating at least the outer surface of the spherical shell.

15. The navigational buoy of claim 12 wherein the plurality of sensors further comprises a Global Positioning System receiver.

16. The navigational buoy of claim 12, wherein the power source comprises a solar panel and a battery.

* * * * *